United States Patent
Sicard

(10) Patent No.: US 7,414,439 B2
(45) Date of Patent: Aug. 19, 2008

(54) RECEIVER FOR A SWITCHED SIGNAL ON A COMMUNICATION LINE

(75) Inventor: Thierry Sicard, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 95 days.

(21) Appl. No.: 10/528,955

(22) PCT Filed: Sep. 24, 2003

(86) PCT No.: PCT/EP03/10714

§ 371 (c)(1),
(2), (4) Date: Mar. 22, 2005

(87) PCT Pub. No.: WO2004/030298

PCT Pub. Date: Apr. 8, 2004

(65) Prior Publication Data

US 2006/0039504 A1    Feb. 23, 2006

(30) Foreign Application Priority Data

Sep. 25, 2002    (EP) ................................ 02292355

(51) Int. Cl.
*H03K 5/153* (2006.01)
(52) U.S. Cl. .............................. 327/60; 327/68; 327/77; 327/544
(58) Field of Classification Search .................... 327/72, 327/74, 77, 80, 90, 93
See application file for complete search history.

(56) References Cited

U.S. PATENT DOCUMENTS

| | | | | |
|---|---|---|---|---|
| 4,716,372 A | * | 12/1987 | Fauser et al. ................... | 327/80 |
| 4,827,205 A | * | 5/1989 | Hafner et al. ................ | 323/281 |
| 5,629,702 A | * | 5/1997 | Koyasu et al. ............... | 341/155 |
| 6,281,714 B1 | | 8/2001 | Ang et al. ....................... | 327/56 |

FOREIGN PATENT DOCUMENTS

WO    WO 95 34152 A    12/1995

\* cited by examiner

*Primary Examiner*—Tuan T. Lam
*Assistant Examiner*—Hiep Nguyen

(57) ABSTRACT

A receiver for receiving a switched signal on a communication line (1), such as a LIN bus, the signal varying between first and second voltage levels (sup, ground). The receiver comprises a comparator (31, 54) responsive to the relative values of the received signal voltage level (Vlin) and an input reference voltage level (Vsup). The comparator (31, 54) comprises a current generator (40, 41) selectively operatble when the recieved signal is asserted to produce an input current (Iin) which is a function of the received signal voltage level (Vlin) and a reference current (Isup) which is a function of the input reference voltage level (Vsup), and output means (28, 32, 31; 55, 56) responsive to the relative values of the input current (Iin) and the reference current (Isup). The output means (28, 32, 31; 56) is supplied with power at a voltage (VDD) substantially lower than the difference between the first and second voltage levels (Vsup, ground). A switch (26, 35, 46) responsive to the input current (Iin) reduces the power consumption of the comparator when the received signal is deasserted.

12 Claims, 4 Drawing Sheets

US 7,414,439 B2

RECEIVER FOR A SWITCHED SIGNAL ON A COMMUNICATION LINE

FIELD OF THE INVENTION

This invention relates to a receiver for a switched signal on a communication line.

BACKGROUND OF THE INVENTION

Local networks often make use of a communication line, such as a communication bus, over which a set of nodes communicates. A driver module in a master node applies power to the line, the driver module being switched to produce step changes in the power in the line to transmit signals to receivers in remote slave nodes over the line. The switched power signal activates the multiplexed remote nodes connected to the line and the line also selectively transmits signals from the remote nodes back to a central processing unit.

Such a bus is used in automotive vehicles, for example, the bus comprising either a single line or a twisted pair of conductors in which the current flows, the close coupling between the pair of conductors reducing their sensitivity to electromagnetic interference ('EMI'), that is to say reception of noise induced in the wires of the bus, and improving their electromagnetic compatibility ('EMC'), that is to say the radiation of parasitic fields by the currents flowing in the wires of the bus; both are critical parameters, especially in automotive applications.

Historically, in automotive applications, functions such as door locks, seat positions, electric mirrors, and window operations have been controlled directly by electrical direct current delivered by wires and switches. Such functions may today be controlled by ECUs (Electronic Control Units) together with sensors and actuators in a multiplexed Controller Area Network (CAN). The Controller Area Network (CAN) standard (ISO 11898) allows data to be transmitted by switching a voltage, at a frequency of 250 kbauds to 1 Mbaud for example, to the multiplexed receiver modules over the twisted pair cable. The receiver modules may be actuators that perform a function, for example by generating mechanical power required, or sensors that respond to activation by making measurements and transmitting the results back to the ECU over the bus.

The CAN bus was designed to be used as a vehicle serial data bus, and satisfies the demands of real-time processing, reliable operation in a vehicle's EMI environment, is cost-effective, and provides a reasonable data bandwidth. However, connecting with the main body network directly via a CAN bus system can be expensive because of increased costs per node and because high overall network traffic can make management extremely difficult. To help reduce costs, the logical extension is to structure the network hierarchically.

A variant on the CAN standard is the LIN (Local Interconnect Network) sub-bus standard (see ISO 7498), which is an extension to the CAN bus, at lower speed and on a single wire bus, to provide connection to local network clusters. A LIN sub-bus system uses a single-wire implementation (enhanced ISO9141), which can significantly reduce manufacturing and component costs. Component costs are further reduced by self-synchronization, without crystal or ceramics resonator, in the slave node. The system is based on common Universal asynchronous receiver and transmitter serial communications interface (UART/SCI) hardware that is shared by most microcontrollers, for a more flexible, lower-cost silicon implementation.

The wires of a communication bus or similar line are often long and present a substantial distributed reactive load to the transmitter to which they are connected and especially their capacitive loads may be individually variable. The distributed impedance gives the wave fronts of a nominally rectangular switched pulse a finite slew rate. It is accordingly important for the receiver to respond at an accurately repeatable signal level in order to ensure accurate timing of the receiver response. This is important for a CAN bus and other systems but the self-synchronisation feature of a LIN system makes it especially important for the response level of a LIN receiver to be precise.

It is also important for the standby current of the nodes of the system to be very low, especially where such systems are powered by a battery or accumulator. Accordingly, the nodes of the system have standby modes of operation, in which current consumption is reduced but it is also desirable for the wake-up time, that is to say the time taken to pass the node from the standby to the operational mode to be short. In addition, cost considerations are important and make it desirable for components of the nodes to use as small an area of silicon as possible; it follows that it is preferable to avoid including extra receiver components to detect the signal front and wake up main receiver elements in the node.

U.S. Pat. No. 6,281,714 discloses a differential receiver circuit for computer and other information processing systems but does not disclose a receiver for a communication bus system enabling standby current of a node of the system to be reduced.

SUMMARY OF THE INVENTION

The present invention provides a receiver for receiving a switched signal on a communication line as described in the accompanying claims.

DETAILED DESCRIPTION OF THE PREFERRED EMBODIMENTS

Figure 1:
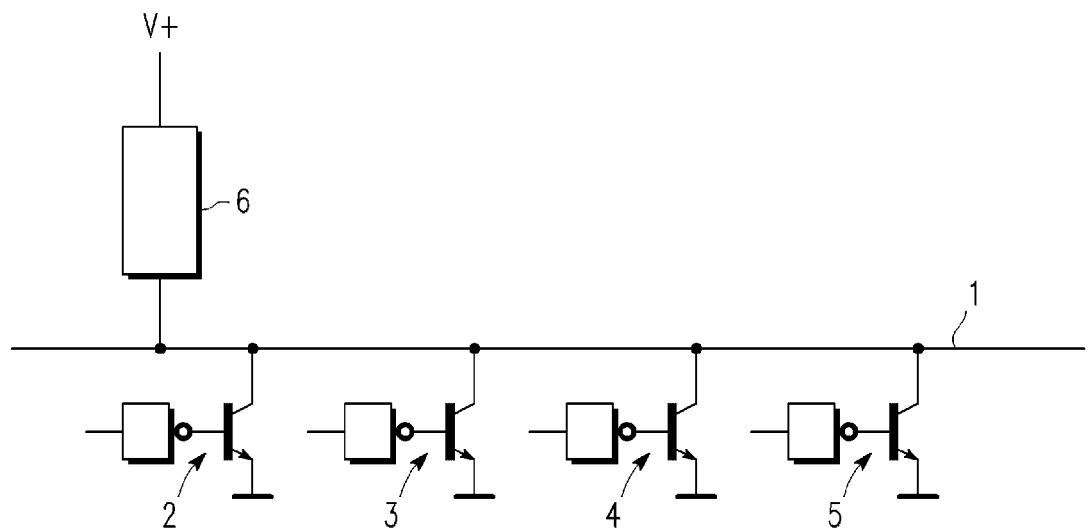
FIG. 1 is a schematic diagram of a typical LIN bus installation to which the present invention may be applied.

A preferred application for the invention is to a LIN bus. FIG. 1 shows the overall structure of a typical LIN bus which is a communication line 1 carrying switched signals, the protocol of which defines data bytes, security and error detection. The LIN bus comprises a single wire with a single channel and is connected to nodes such as 2, 3, 4 and 5, one of which is a master node capable of transmitting and receiving and the other nodes are slave nodes capable only of receiving. All nodes include a slave communication task that is split into a transmit and a receive task, while the master node includes an additional master transmit task. The slave nodes are synchronised without crystal or ceramics resonators in the slave nodes. While this application to a LIN bus is a preferred application of the invention, it will be appreciated that the invention is also applicable to other communication lines.

Figure 2:
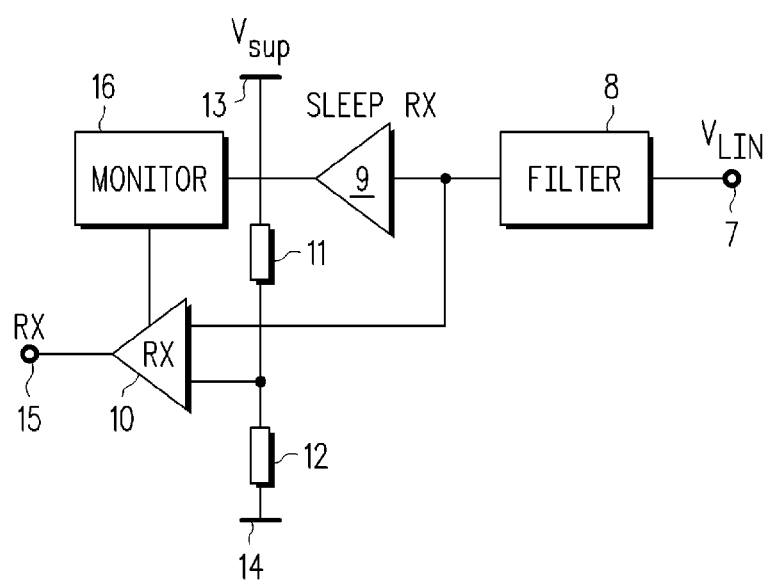
FIG. 2 is a schematic diagram of a known receiver for a LIN bus.

FIG. 2 shows a known receiver in a node (master or slave) for a LIN bus. The bus supplies an input signal to a terminal 7, which is connected to a low pass filter 8 that removes radio frequency interference. The filtered signal is supplied to a first receiver 9 and a second receiver 10. The first receiver 9 responds with relatively low accuracy to a reduction in the voltage at the terminal 7 corresponding to the arrival of a wave front of a pulse. The first receiver 9 is permanently energised and operational, even in the standby mode of the node. It operates with a low quiescent current. The second receiver 10 has one input connected to receive the signal from the LIN terminal 7 and a second input connected to the junction between 2 resistors 11 and 12, connected in series between a positive supply terminal 13 and ground 14 to form a voltage divider. The output of the receiver 10 is connected to a node output terminal 15 and is activated and deactivated by a monitor 16.

Figure 3:
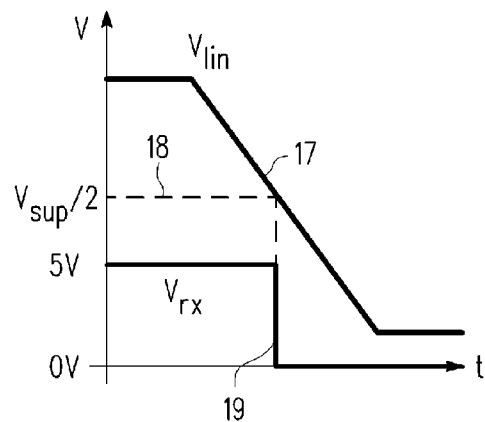
FIG. 3 is a diagram of signals appearing in operation of the LIN bus installation of FIG. 1.

In operation, when the first receiver 9 detects the beginning of a pulse at the LIN terminal 7, the monitor 16 activates the main receiver 10, which compares the signal from the voltage divider formed by resistors 11 and 12 and asserts a signal on the output terminal 15 at the moment when the signal from the filter 8 drops below the reference voltage. The signal levels are illustrated in FIG. 3, where the signal from the filter 8 is shown at 16, the reference threshold voltage defined by the voltage divider 11 and 12 is shown at 17 and the output signal at the node output terminal 15 is shown at 18. When the voltage from the filter 8 exceeds the voltage from the voltage detector 11, 12 again, the second receiver 10 re-asserts the pulse on the output terminal 15 and when the signal from the filter 8 reaches the de-assert level and stays there for longer than the length of a code frame, the monitor 16 reactivates the second receiver 10. The second receiver 10 can be designed with a higher quiescent current than the first receiver 9, and accordingly may have a higher accuracy, since it is deactivated in the standby mode.

The use of a standby mode of operation reduces the current consumption, but the architecture with the main receiver 10 woken up by the first receiver 9, increases the wake up time. Also, the use of two receivers increases the area of silicon used by the integrated circuit of the node.

Figure 4:
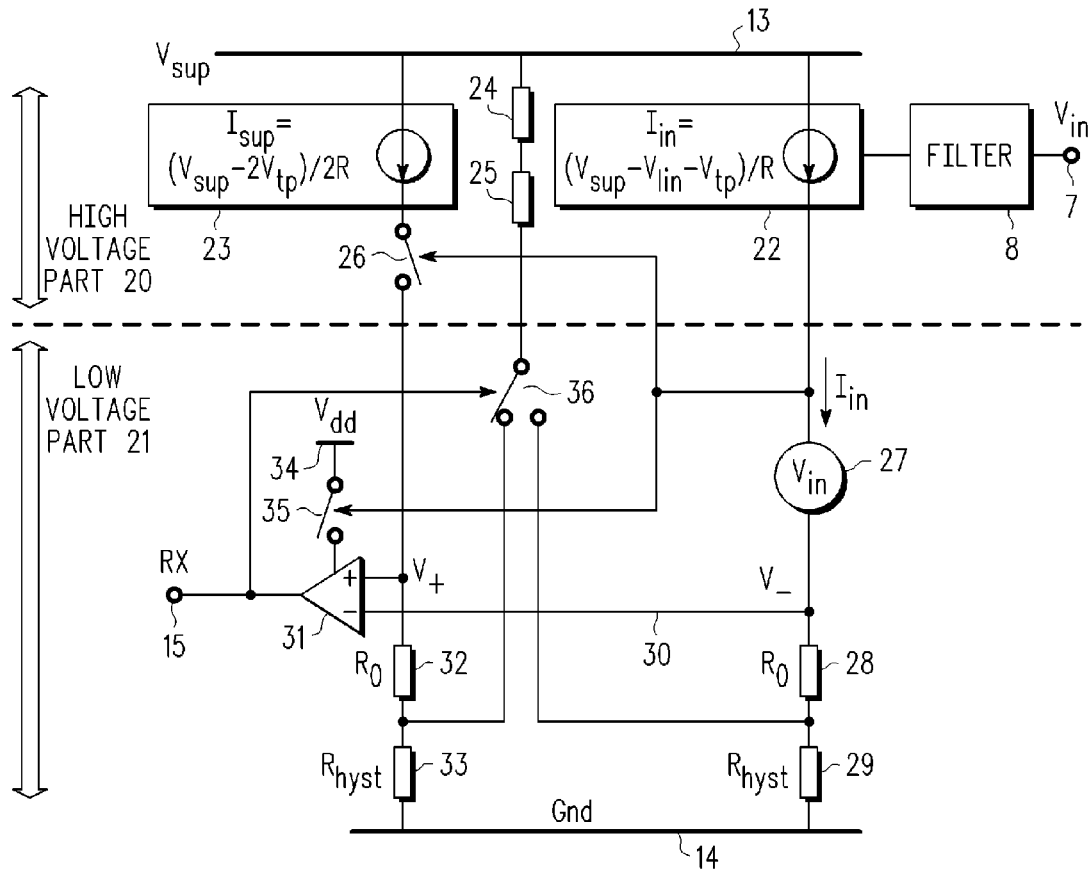
FIG. 4 is a schematic diagram of a receiver for a LIN bus in accordance with one embodiment of the invention, given by way of example.

FIG. 4 shows a node in accordance with a first preferred embodiment of the present invention. The node comprises a single receiver; the receiver comprises a high voltage part 20 and a low voltage part 21. The high voltage part 20 comprises voltage to current converters 22 and 23, resistive elements 24 and 25 and a switch 26. These elements need to swing between a voltage close to or equal to $V_{SUP}$ and a voltage close to ground and accordingly need to be designed with high voltage components; by way of indication, in automotive applications, $V_{SUP}$ may be of the order of 14 volts maximum or 42 volts maximum. The low voltage part 21 of the node may use components designed to withstand only a substantially lower voltage, of the order of 3 to 5 volts, for example.

The converter 22 is connected to receive a voltage $V_{LIN}$ from the filter 8, corresponding to the signal 17, and the supply voltage $V_{SUP}$ from the supply terminal 13 and generates a current $I_{IN}$ proportional to the difference between the voltages ($V_{SUP}$-$V_{LIN}$) diminished by a small gate-source threshold voltage $V_{TP}$. The current $I_{IN}$ is inversely proportional to a resistance R in the converter 22. The current $I_{IN}$ is passed through the series combination of a field effect transistor (FET) 27 with a resistor 28 of value $R_0$ and another resistor 29 of value $R_{HYST}$. The resistor 29, whose function will be explained below, is connected between the resistor 28 and the ground terminal 14. The junction of the FET 27 with the resistor 28 is at a voltage $V_-$ and is connected by a line 30 to an input of a voltage comparator 31.

The converter 23 also receives the supply voltage $V_{SUP}$ and is arranged to generate a current $I_{SUP}$ proportional to $V_{SUP}$ diminished by twice the value of the gate-source threshold voltage $V_{TP}$ and inversely proportional to twice the resistance R. The current $I_{SUP}$ is passed through the switch 26 and then is passed through the series combination of resistors 32 and 33, similar to the resistors 28 and 29, and having the resistance values $R_0$ and $R_{HYST}$ respectively. The resistor 33 connects one end of the resistor 32 to the ground terminal 14 and the other end of the resistor 32 is connected to supply a voltage $V_+$ to the second input terminal of the voltage comparator 31. The output of the voltage comparator 31 is supplied to the node output terminal 15.

The voltage comparator 31 is energised by a supply voltage $V_{DD}$ from a terminal 34 through a switch 35, the voltage $V_{DD}$ being substantially lower than the voltage $V_{SUP}$ at the terminal 13.

The switches 26 and 35 are actuated by the voltage across the series combination of the FET 27 and the resistors 28 and 29 so that as soon as the current $I_{IN}$ appears, the switches 26 and 35 are closed. In this way, the quiescent current is at a very low level, but the wake up time is very short, corresponding to the application of the currents and voltages to the resistors 32 and 33 and the voltage comparator 31.

In the absence of any hysteresis feedback, the receiver as described above, would tend to hover or oscillate between the two output signal values in response to small input signal variations or noise when the input signal level is close to the reference level. To avoid this, the output terminal 15 is connected to actuate a bi-stable switch 36 that alternately connects the junction between resistors 28 and 29 or the junction between resistors 32 and 33 to the series combination of resistors 24 and 25, the other end of which is connected to the supply terminal 13. The value $R_{HYST}$ of the resistors 33 and 29 is chosen to be small relative to the values of the resistors 24 and 25.

Figure 5:
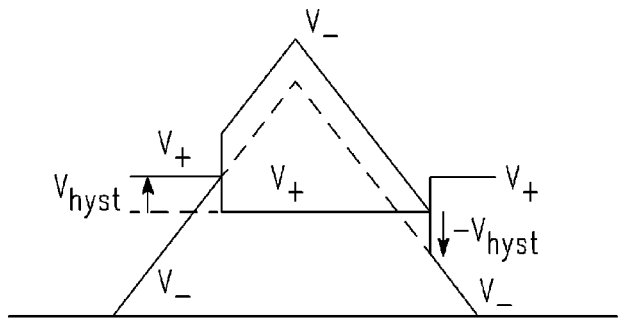
FIG. 5 is a diagram of signals appearing in operation of the receiver of FIG. 4.

In operation, as shown in FIG. 5, the switch 36 is connected so that, as the voltage $V_-$ increases past the voltage $V_+$, the switch 36 changes pole to connect the resistors 24 and 25 to the resistor 29 and increase further the voltage $V_-$, the disconnection of resistors 24 and 25 from the resistor 33 simultaneously decreasing the voltage $V_+$. When the voltage $V_-$ subsequently decreases again past the value of $V_+$, the switch 36 changes pole to connect the resistors 24 and 25 to the resistor 23, decreasing further the voltage $V_-$ and increasing the voltage $V_+$.

Figure 6:
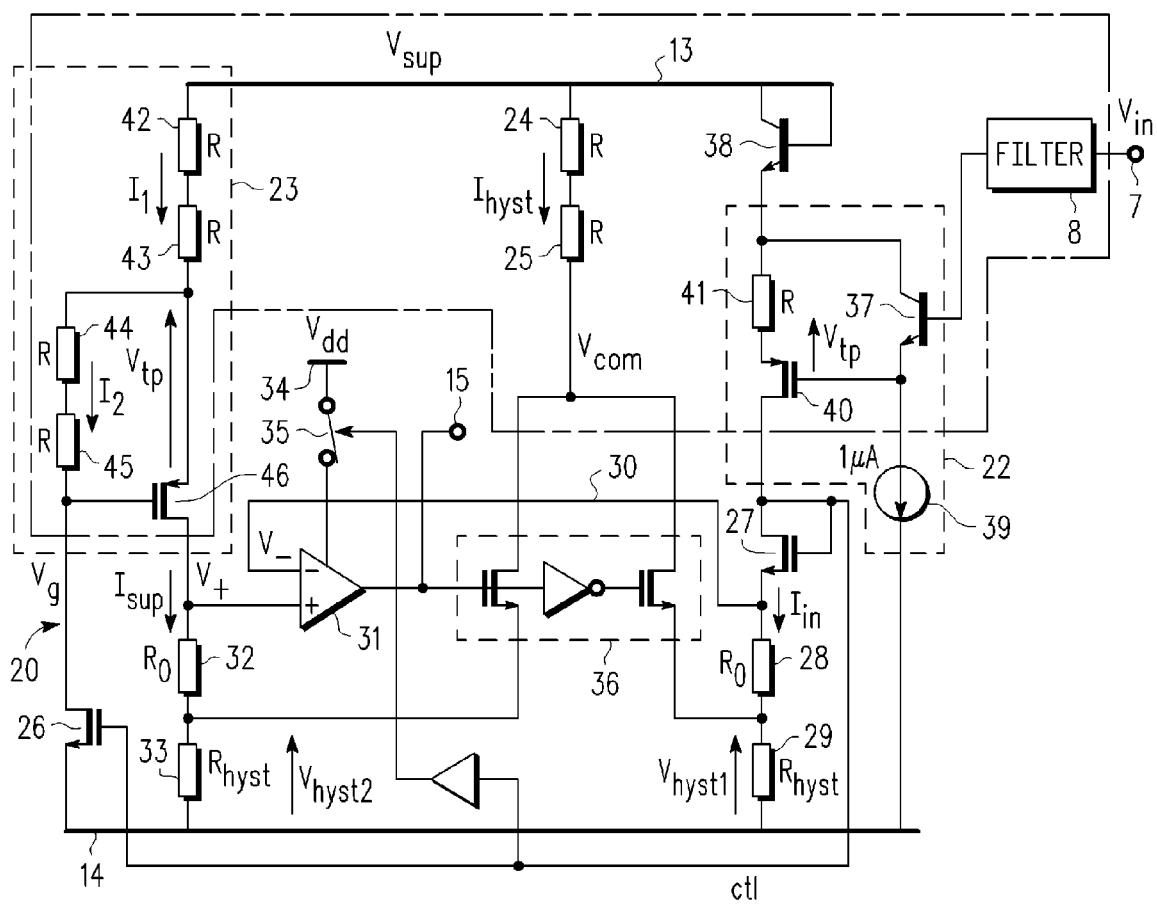
FIG. 6 is a diagram showing the receiver of FIG. 4 in more detail.

A preferred implementation of the receiver shown in FIG. 4 is shown in FIG. 6, where similar elements have similar reference numerals. An npn transistor 37 is connected between the filter 8 and the supply terminal 13 and an npn transistor 38 is connected between the filter 8 and the input to the amplifier 22 the transistors 37 and 38 serving to protect the rest of the receiver from electrostatic discharge on the LIN terminal 7 or the supply terminal 13. The signal from the filter 8 is connected through the base and emitter of the transistor 37 to a current source 39 that limits the current flowing down to ground 14 to 1 microamp when the LIN signal is de-asserted at the level of $V_{SUP}$. The converter 22 comprises a PMOS FET 40 whose source is connected through a resistor 41 of resistance R to the emitter of transistor 38, whose collector is connected to the supply terminal 13, its base being shorted to its collector. The junction between the resistor 41 and the transistor 38 is connected to the emitter of transistor 37. The gate of FET 40 is connected to the junction between the emitter of transistor 37 and the current source 39. The drain of transistor 40 is connected to the drain of transistor 27, which is an NMOS FET, and whose source is connected to the resistor 28, its gate being shorted to its drain.

In operation, when the LIN signal at terminal 7 is de-asserted, the voltage 17 applied to the base of the transistor 37 is close to the supply voltage $V_{SUP}$ on terminal 13, the transistor 37 is conductive, the voltage on the gate of the FET 40 is also close to that of the supply terminal 13, and the FET 40 is switched off. When the signal 17 at the base of transistor 37 reduces, the voltage at its emitter also reduces and once the difference from the voltage $V_{SUP}$ at the terminal 13 exceeds the gate-source threshold voltage $V_{TP}$ of the FET 40, the FET 40 begins to conduct. The current flowing in the resistor 41 and the FETs 40 and 27 and the resistors 28 and 29, is proportional to the voltage across the resistor 41, that is to say the difference between the LIN signal $V_{LIN}$ and the supply voltage $V_{SUP}$ diminished by the threshold voltage $V_{TP}$ of FET 40.

The junction between the drains of FETs 40 and 27 is connected to actuate the switches 26 and 35 so that, as soon as current flows in the resistors 28 and 29, the resulting voltage closes the switches 26 and 35.

The current converter 23 comprises the series combination of two resistors 42 and 43 each of resistance R and the series combination of two resistors 44 and 45, also each of resistance R, in series with the switch 26 between the terminals 13 and 14. A PMOS FET 46 has its source connected to the junction between resistors 43 and 44, its drain connected to the resistor 32 and its gate connected to the junction between the resistor 45 and the switch 26, the latter being formed by an NMOS FET.

The operation of the receiver without the hysteresis effect can be represented by the following equations $$I_1 = \frac{V_{sup} - V_g - V_{tp}}{2R}; \quad I_2 = \frac{V_{tp}}{2R} \qquad \text{Equation 1}$$

where $I_1$ is the current flowing in the resistors 42 and 43 and $I_2$ is the current flowing in the resistors 44 and 45.

When the receiver is turned on, FET 26 is conductive, connecting the gate of the FET 46 to ground, so that $V_g=0$.

$$I_{sup} = I_1 - I_2 = \frac{V_{sup} - V_{tp}}{2R} - \frac{V_{tp}}{2R} = \frac{V_{sup} - 2V_{tp}}{2R} \qquad \text{Equation 2}$$

where $I_{sup}$ is the current flowing in the source-drain path of the FET 46.

$$I_{in} = \frac{V_{sup} - V_{lin} - V_{tp}}{R} \qquad \text{Equation 3}$$

where $I_{in}$ is the current flowing in the source-drain path of the FET 27.

$$V_+ = \frac{V_{sup}}{2R} - C; \quad V_- = \frac{V_{sup} - V_{lin}}{R} - C, \qquad \text{Equation 4}$$

$$\text{where } C = \frac{V_{tp}(R_o + R_{hyst})}{R}$$

It follows that, apart from the effect of hysteresis introduced by the feedback applied to the resistors 29 and 33, $$V_+ = V_- \text{ when } V_{lin} = \frac{V_{sup}}{2} \qquad \text{Equation 5}$$

It will be appreciated that, in the embodiment described above, the converter 22 generates an input current $I_{IN}$ which is a function of the received signal voltage level $V_{LIN}$. The converter 23 generates a reference current $I_{SUP}$ that is a function of the reference voltage level, the supply voltage $V_{SUP}$ on the terminal 13. The comparator 31 responds to the relative values of the voltages generated across the resistors 28 and 29 on one hand and the resistors 32 and 33 on the other hand by the currents $I_{IN}$ and $I_{SUP}$ respectively. The voltage comparator 31 is supplied with power at a voltage $V_{DD}$ substantially lower than the swing in the input signal $V_{LIN}$ between the supply voltage $V_{SUP}$ at the terminal 13 and ground at the terminal 14.

The switch 35 renders the comparator 31 selectively operable when the received signal $V_{LIN}$ is asserted. Again, the currents $I_{SUP}$ and $I_{IN}$ are generated only when the received signal is asserted. Accordingly the power consumption of this part of the receiver is reduced when the received signal is de-asserted. Voltages developed across the resistors 28 and 29 on one hand and resistors 32 and 33 on the other hand are substantially smaller than the swing in the input signal voltage level $V_{LIN}$. All these components are included in the low voltage part 21 of the receiver.

The input current $I_{IN}$ is produced as a function of the relative voltage levels of the received signal and said input reference voltage level. Accordingly, fluctuations in the supply voltage $V_{SUP}$ are cancelled when the input current $I_{IN}$ is compared with the reference current $I_{SUP}$ generated directly from the supply voltage $V_{SUP}$.

Figure 7:
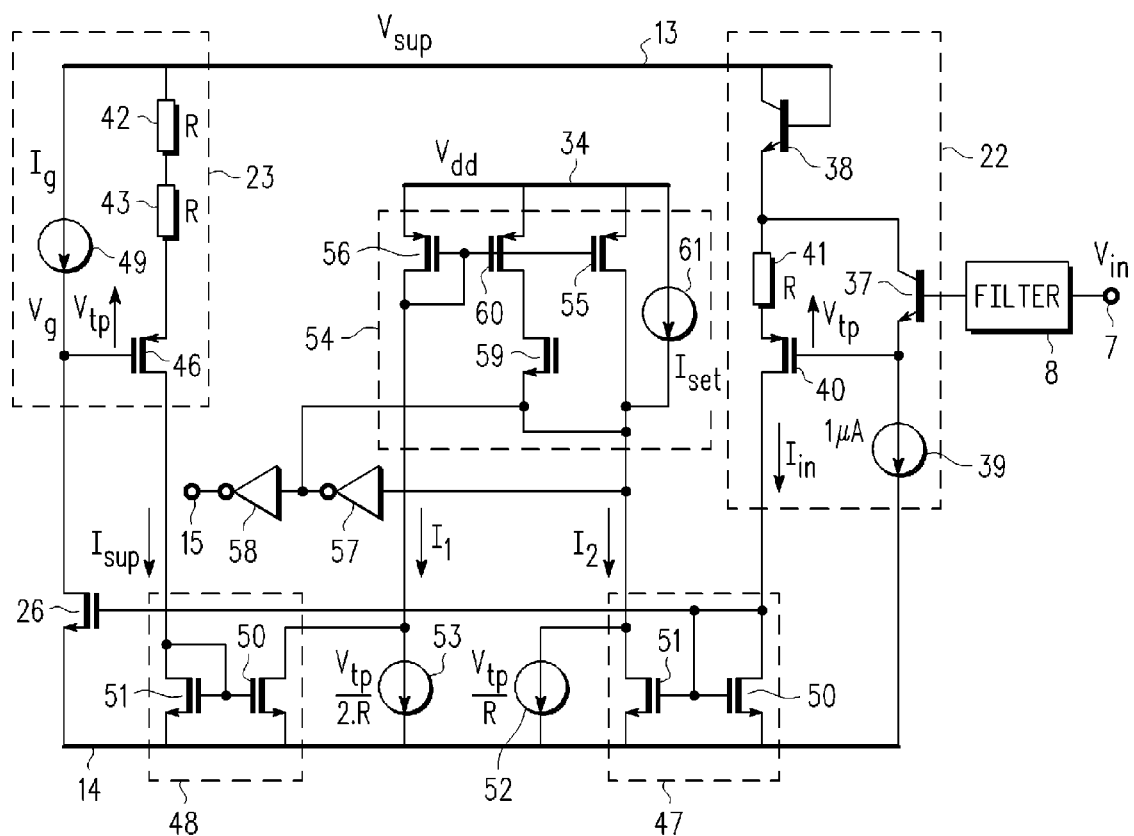
FIG. 7 is a schematic diagram of a receiver for a LIN bus in accordance with another embodiment of the invention, given by way of example

FIG. 7 shows another embodiment of the present invention. In the embodiment of FIGS. 4 to 6, the input voltage is compared with the reference voltage by means of a voltage comparator. In the embodiment of FIG. 7, a current comparator compares the relative values of the input current $I_{IN}$ and the reference current. In FIG. 7, elements that are similar to corresponding elements in FIG. 6 bear similar reference numerals.

The input voltage to current converter 22 supplies the current $I_{IN}$ to a current mirror 47. The reference voltage to current converter 23 supplies the reference current $I_{SUP}$ to a current mirror 48 and, instead of the resistors 44 and 45 of the embodiment of FIG. 6, the gate of the FET 46 is connected to the supply terminal 13 through a current source 49 that limits the current to a value $I_G$.

The current mirrors 47 and 48 each comprise first and second NMOS FET 50 and 51. In each case the current input to the current mirror is passed to the drain terminal of the first FET 50, whose source is connected to the ground terminal 14 and whose gate is shorted to its drain terminal. The source of the second FET 51 is also connected to the ground terminal 14, in each case, and its gate is connected to the gate of the respective first FET 50, its source providing the output current of the current mirror. Compensation current sources 52 and 53 are connected in parallel with the drain-source paths of the FETs 51 of the current mirrors 47 and 48 respectively to provide compensation currents correcting a potential source of inaccuracy in the comparison of the currents $I_{IN}$ and $I_{SUP}$. The current source 52 generates a current equal to $V_{TP}/R$, where $V_{TP}$ is the gate-source threshold voltage of the FETs 40 and 46 and R is the resistance of the resistors 41, 42 and 43. The current source 53 generates a current equal to $V_{TP}/2R$. The FET 51 of the current mirror 47 produces an output current equal to $I_{IN}$ and, together with the current source 52, passes a current $I_2$ to a current comparator 54. Similarly, the FET 51 of the current mirror 48 produces a current equal to $I_{SUP}$ that, combined with the current from current source 53, passes a current $I_1$ to the current comparator 54.

The current comparator 54 comprises a first PMOS FET 55 whose source is connected to the low voltage supply terminal 34 and whose drain is connected to receive the current $I_2$ from the current mirror 47. The current comparator 54 also comprises a PMOS FET 56 whose source is connected to the low voltage supply terminal 34 and whose drain is connected to receive the current $I_1$ from the current mirror 48. The gate of the FET 56 is shorted to its drain and the gates of FETs 55 and 56 are connected together.

In operation, when the input signal on the terminal 7 is de-asserted, the difference between the supply voltage on the terminal 13 and the voltage level $V_{LIN}$ from the filter 8 is smaller than the source gate threshold voltage $V_{VT}$ of the FET 40, so that the current $I_{IN}$ is 0 and the current $I_2$ is also substantially 0. The FET 26 is turned off so that the voltage of the gate of the FET 46 rises to the supply voltage $V_{SUP}$ of the terminal 13 and the FET 46 is also turned off.

As the input voltage $V_{LIN}$ reduces, the current $I_{IN}$ starts to increase and the FETs 26 and 46 are turned on. As long as the current $I_2$ remains smaller than the current $I_1$, the FET 55 is maintained conductive and the voltage at the junction between the drains of the FET 55 and the FET 51 of the current mirror 47 is close to the low voltage supply of terminal 34. When the current $I_2$ exceeds the current $I_1$, the FET 55 is turned off and the FET 56 is turned on, the voltage at the junctions between FET 55 and current mirror 47 falling close to the ground terminal 14.

Hysteresis is provided by an inverter 57, the output of the inverter 57 being supplied to the node output terminal 15 through an output inverter 58. The output of inverter 57 is connected to the gate of a PMOS FET 59, whose source is connected to the drain of FET 55. The drain of FET 59 is connected to the drain of a PMOS FET 60 whose source is connected to the low voltage terminal 34. The gate of FET 60 is connected to the gates of FETs 55 and 56.

A source of a small current $I_{SET}$ is connected across the source and drain of the FET 55, to provide a current at the start of the circuit.

The operation of the receiver without the hysteresis effect can be represented by the following equations $$I_{in} = \frac{V_{sup} - V_{lin} - V_{tp}}{R}; I_{sup} = \frac{V_{sup} - V_g - V_{tp}}{2R}; I_{vt} = \frac{V_{tp}}{R} \quad \text{Equation 6}$$

where $I_{vt}$ is the current in the source 52.

$$I_1 = \frac{V_{sup}}{2R}; I_2 = \frac{V_{sup} - V_{lin}}{R} \quad \text{Equation 7}$$

It follows that, apart from the effect of hysteresis introduced by the feedback applied to the resistors 29 and 33, $I_2 = I_1$ when $$\frac{V_{sup} - V_{lin}}{R} = \frac{V_{sup}}{2R}; V_{lin} = \frac{V_{sup}}{2} \quad \text{Equation 8}$$

The invention claimed is:

1. A receiver for receiving a received signal on a communication line, a voltage level of said received signal varying between first and second voltage levels, said receiver being responsive to the relative values of the voltage level of the received signal and to a reference voltage level, said receiver comprising:
a current generating unit selectively operable when said received signal is asserted to produce an input current which is a function of said voltage level of the received signal and to produce a reference current which is a function of said reference voltage level,
a comparator comprising an output responsive to the relative values of said input current and said reference current, said comparator being supplied with power at a voltage substantially lower than the difference between said first and second voltage levels, and said comparator being responsive to said received signal to reduce its power consumption when said received signal is de-asserted.

2. A receiver as claimed in claim 1, wherein said comparator is selectively operable when said received signal is asserted.

3. A receiver as claimed in claim 1, wherein said comparator comprises a switch unit responsive to said input current for reducing the power consumption of said comparator when said received signal is de-asserted.

4. A receiver as claimed in claim 1, wherein said voltage level of the received signal is substantially equal to said reference voltage level when the received signal de-asserted and is relatively small when the received signal asserted.

5. A receiver as claimed in claim 1, wherein said current generating unit is arranged to produce said input current as a function of the voltage level of the received signal relative to said reference voltage level when said received signal is asserted.

6. A receiver as claimed in claim 1, wherein said current generating unit comprises an input stage including a current limiter in series with a current amplifier element that presents a high impedance when said received signal is asserted, and a converter stage for passing said input current as a function of the voltage level of said received signal when said received signal is asserted.

7. A receiver as claimed in claim 6, wherein said converter stage comprises a resistive element and said input stage is arranged to apply a voltage which is a function of the difference between the voltage level of said received signal and said reference voltage level across said resistive element when said received signal is asserted.

8. A receiver as claimed in claim 7, wherein said current generating unit comprises a reference converter stage for passing said reference current as a function of said reference voltage level when said received signal is asserted, said reference converter stage comprising a resistive element across which said reference voltage level is applied when said received signal is asserted.

9. A receiver as claimed in claim 8, wherein said converter stage and said reference converter stage present similar threshold voltages that modify the voltages applied across said resistive elements.

10. A receiver as claimed in claim 1, comprising comparator resistive elements for receiving said input current and said reference current respectively and said comparator is a voltage comparator responsive to the relative values of the voltages developed across said comparator resistive elements, the voltages developed across said comparator resistive elements being substantially smaller than the difference between said first and second voltage levels.

11. A receiver as claimed in claim 1, wherein said comparator is a current comparator responsive to the relative values of said input current and said reference current, the voltages developed in said current comparator being substantially smaller than the difference between said first and second voltage levels.

12. A receiver as claimed in claim 1, comprising a hysteresis unit for modifying the response of said comparator to said relative values, whereby to avoid oscillation of said comparator in response to a small change in input.

* * * * *